Figure 1:
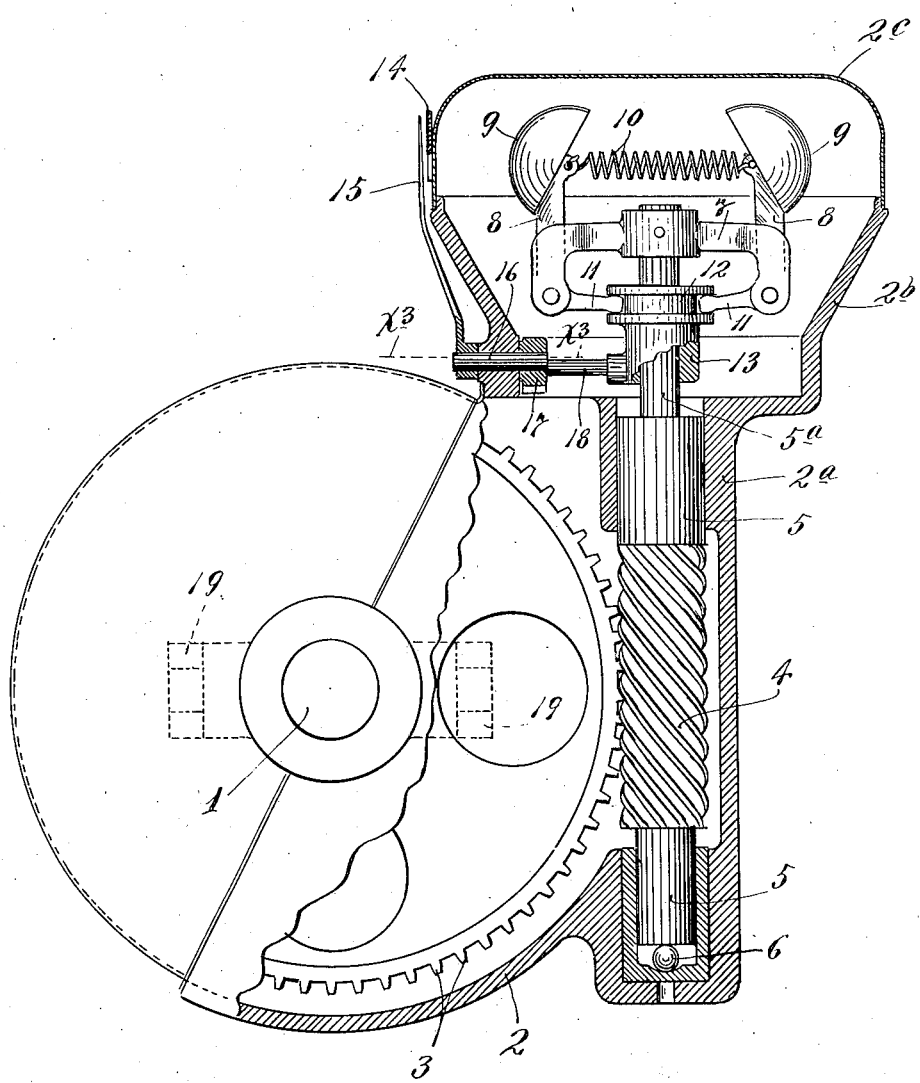

L. T. JENSEN.
SPEED INDICATOR.
APPLICATION FILED NOV. 5, 1913.

1,125,332.

Patented Jan. 19, 1915.
2 SHEETS—SHEET 1.

Witnesses.
A. H. Opsahl
B. G. Wheeler

Inventor.
Louis T. Jensen.
By his Attorneys.
Williamson & Merchant

L. T. JENSEN.
SPEED INDICATOR.
APPLICATION FILED NOV. 5, 1913.
1,125,332.
Patented Jan. 19, 1915.
2 SHEETS—SHEET 2.
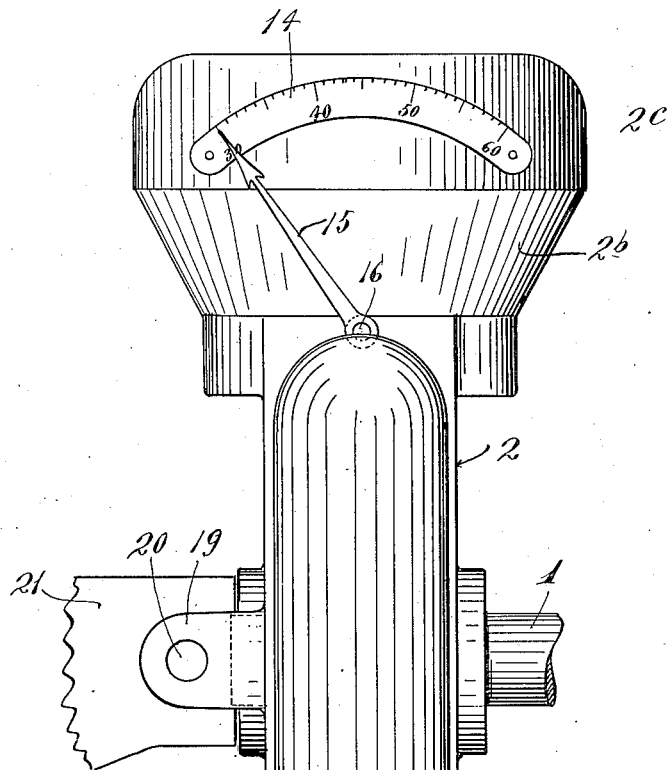
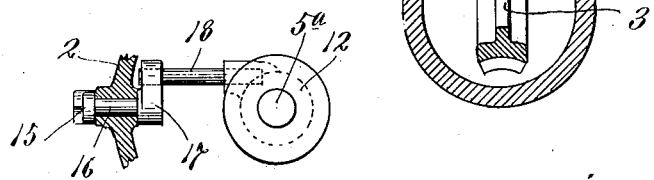
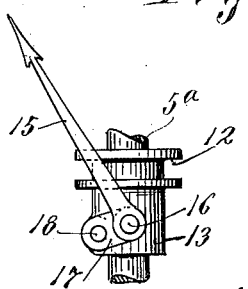
Witnesses.
A. H. Opsahl.
B. G. Wheeler.
Inventor.
Louis T. Jensen.
By his Attorneys.
Williamson Merchant

UNITED STATES PATENT OFFICE.

LOUIS T. JENSEN, OF MINNEAPOLIS, MINNESOTA.

SPEED-INDICATOR.

1,125,332.   Specification of Letters Patent.   Patented Jan. 19, 1915.

Application filed November 5, 1913. Serial No. 799,321.

*To all whom it may concern:*

Be it known that I, LOUIS T. JENSEN, a citizen of the United States, residing at Minneapolis, in the county of Hennepin and State of Minnesota, have invented certain new and useful Improvements in Speed-Indicators; and I do hereby declare the following to be a full, clear, and exact description of the invention, such as will enable others skilled in the art to which it appertains to make and use the same.

My invention has for its object to provide an improved speed indicator, and to such ends, generally stated, the invention consists of the novel devices and combinations of devices hereinafter described and defined in the claims.

This improved speed indicator is adapted for general use to indicate directly the speed of rotation in revolutions of a rotating shaft or member, and hence, may be used to indicate the speed of travel of a vehicle. However, the indicator, as illustrated in the drawings, is shown as especially designed for application to the driving crank of a cream separator. In the use of cream separators, it is essential to good results that the driving crank be continuously rotated at a predetermined speed. If the speed of the separator be allowed to fluctuate much above or much below the predetermined speed required for high efficiency, bad separation will be made, and there will be a waste of cream.

In the accompanying drawings which illustrate the invention, like characters indicate like parts throughout the several views.

Referring to the drawings: Figure 1 is a view partly in side elevation and partly in vertical section, showing the improved speed indicator; Fig. 2 is a front elevation of the indicator; Fig. 3 is a horizontal section taken on the line $x^3$ $x^3$ on Fig. 1; and Fig. 4 is a fragmentary view showing in detail the indicator pointer and certain connections thereto.

The crank shaft of the driving mechanism of a cream separator or similar machine, is indicated by the numeral 1. This crank shaft 1, it may be assumed, is driven by hand power through a suitable crank, not shown, but such as usually provided in a cream separator. This crank shaft is journaled in suitable bearings on the casing 2, which may be suitably secured to the frame of a cream separator. The crank shaft 1 carries a worm gear 3 that meshes with a worm 4 of an upright spindle 5, which spindle is journaled in suitable bearings in a sleeve-like vertical extension $2^a$ of the case 2. As shown, the lower end of the spindle 4 rests on an axially located ball 6. The sleeve-like extension $2^a$ of the casing 2 has an expanded upper end portion $2^b$ provided, as shown, with a detachable cover section $2^c$. The said parts $2^c$ and $2^b$ constitute a casing for the centrifugal governor which is carried by the upper end of the spindle 5. The upper end of the spindle 5 is reduced at $5^a$, and to the upper end of this reduced portion is secured a transversely extended head 7, to which the arms 8 of fly balls or weights 9 are secured. A coiled spring 10 connects the fly balls 9, or, otherwise stated, the upper ends of the arms 8. At their pivoted lower ends, the arms 8 are provided with inwardly extended fingers 11, that work in a peripheral groove 12 of a collar 13. The collar 13 is free for sliding movements on the reduced portion $5^a$ of the spindle, and the said spindle is free for rotation therein.

Secured on a suitable support, such as the cover $2^c$, is a segmental properly graduated dial 14. A pointer 15 coöperates with this dial and this pointer is secured to the outer end of a short rock shaft 16 journaled in a suitable bearing on the case extension $2^b$ and provided at its inner end with a short arm 17. This arm 17 is provided at its free end with an eye, through which is extended the projecting end of an arm, preferably in the form of a small rod 18, the inner end of which is rigidly secured to the sleeve 13. The dial 14 must, of course, be properly graduated to indicate within a certain range, the number of revolutions of the shaft 1, and the spring 10 must be of the proper tension to obtain this result. Means might be provided for adjusting the tension of the spring 10 to vary the action of the governor for indicating different speeds, but I prefer to provide a series or several of such springs having different tension, wherever these changes are desired.

When the shaft 1 is at rest, the fly balls 9 will be in the position shown in Fig. 1, and the pointer 15 will stand on the zero mark of the indicator scale 14. When the crank shaft 1 is rotated, centrifugal force will, of course, throw the fly balls outward, and outward movement of the fly balls will cause the sleeve 13 to be raised, and under this upward movement, its rod 18, by engagement with the arm 17, will cause the pointer 15 to move over the scale and indicate the speed in rotations per minute, at which the shaft 1 is being rotated. The connection between the sleeve 13 and pointer is, as is obvious, very simple, and yet very efficient. The engagement of the rod 18 with the eye of the arm 17 holds the sleeve 13 against rotation with the spindle, but at the same time, it permits the rod 18 to oscillate slightly, as required to follow the arc of movement of the short arm 17, when the same and the pointer 15 are oscillated. The relatively fixed casing 2, as shown, is provided with laterally projecting lugs 19 that are connected by a bolt or pin 20 to a hub 21, which hub is usually found on cream separators. In this way, the casing and, in fact, the entire indicator, is made readily detachable from the separator.

The entire indicator is of simple construction and small cost, and has no parts that are extremely delicate in construction or likely to get out of order or to wear rapidly.

What I claim is:

1. In a speed indicator, the combination with a driven spindle and centrifugal governor carried thereby, of a graduated scale and coöperating pivoted pointer having a pivotal movement in respect to the said scale and provided with an arm radiating from its pivot, said arm having an eye at its outer end, and a sleeve loosely mounted on said spindle, subject to said governor and provided with a rod that projects from the spindle, the free end of which rod engages the eye of said arm.

2. In a speed indicator, the combination with a driven spindle and a pair of spring-connected, weighted governor arms carried thereby, of a graduated scale, an oscillatory pointer coöperating with said scale, an arm having one end connected to said pointer and provided at its free end with an eye, and a sleeve loosely mounted on said spindle, subject to said governor arms and provided with a projecting rod, the free end of which engages the eye of said arm.

3. The combination with a driven spindle provided at one end with a transversely extended head, spring connected fly balls having arms pivotally connected to said head and provided with inwardly projecting fingers, a scale, a pointer, a short arm connected at one end to said pointer and provided at its free end with an eye, a sleeve loosely mounted on said spindle and having a peripheral groove in which the fingers of the said fly ball arms engage, and a rod rigidly secured to and projected radially from said sleeve and extending into the eye of said arm.

In testimony whereof I affix my signature in presence of two witnesses.

LOUIS T. JENSEN.

Witnesses:
EDITH S. HOLLOWAY,
HARRY D. KILGORE.